United States Patent
Peng (10) Patent No.: US 11,640,657 B2
(45) Date of Patent: May 2, 2023

(54) SYSTEM AND METHOD FOR MEASURING DISTORTED ILLUMINATION PATTERNS AND CORRECTING IMAGE ARTIFACTS IN STRUCTURED ILLUMINATION IMAGING

(71) Applicant: ARIZONA BOARD OF REGENTS ON BEHALF OF THE UNIVERSITY OF ARIZONA, Tucson, AZ (US)

(72) Inventor: Leilei Peng, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 17/797,270

(22) PCT Filed: Feb. 3, 2021

(86) PCT No.: PCT/US2021/016385
§ 371 (c)(1),
(2) Date: Aug. 3, 2022

(87) PCT Pub. No.: WO2021/158642
PCT Pub. Date: Aug. 12, 2021

(65) Prior Publication Data
US 2023/0050218 A1    Feb. 16, 2023

Related U.S. Application Data (60) Provisional application No. 62/969,300, filed on Feb. 3, 2020.

(51) Int. Cl.
G06T 5/20 (2006.01)
G06T 7/00 (2017.01)
(Continued)

(52) U.S. Cl.
CPC ............... G06T 5/20 (2013.01); G02B 21/06 (2013.01); G06T 5/10 (2013.01); G06T 7/0002 (2013.01);
(Continued)

(58) Field of Classification Search
CPC .......... G06T 5/20; G06T 5/10; G06T 7/0002; G06T 2207/10056; G06T 2207/10144;
(Continued)

(56) References Cited

U.S. PATENT DOCUMENTS 11,525,993 B2 * 12/2022 Carney .................. G02B 21/26
2006/0186311 A1    8/2006 Backs et al.
(Continued)

OTHER PUBLICATIONS

Yeh et al, Structured illumination microscopy with unknown patterns and a statistical prior, vol. 8, No. 2 | Feb. 1, 2017 | Biomedical Optics Express 695 (Year: 2017).*
(Continued)

*Primary Examiner* — Andrae S Allison
(74) *Attorney, Agent, or Firm* — George McGuire (57) ABSTRACT

A method for measuring distorted illumination patterns and correcting image artifacts in structured illumination microscopy. The method includes the steps of generating an illumination pattern by interfering multiple beams, modulating a scanning speed or an intensity of a scanning laser, or projecting a mask onto an object; taking multiple exposures of the object with the illumination pattern shifting in phase; and applying Fourier transform to the multiple exposures to produce multiple raw images. Thereafter, the multiple raw images are used to form and then solve a linear equation set to obtain multiple portions of a Fourier space image of the object. A circular 2-D low pass filter and a Fourier Transform are then applied to the portions. A pattern distortion phase map is calculated and then corrected by making a coefficient matrix of the linear equation set varying in phase, which is solved in the spatial domain.

7 Claims, 3 Drawing Sheets

(51) Int. Cl.
  *G06T 5/10* (2006.01)
  *G02B 21/06* (2006.01)
  *G01B 11/25* (2006.01)
(52) U.S. Cl.
  CPC .... *G01B 11/25* (2013.01); *G06T 2207/10056* (2013.01); *G06T 2207/10144* (2013.01); *G06T 2207/20048* (2013.01); *G06T 2207/30168* (2013.01)
(58) Field of Classification Search
  CPC ........... G06T 2207/20048; G06T 2207/30168; G02B 21/06; G01B 11/25
  See application file for complete search history.

(56) References Cited

U.S. PATENT DOCUMENTS

| | | | | |
|---|---|---|---|---|
| 2008/0103390 A1* | 5/2008 | Contag | ........... | A61B 90/36 600/478 |
| 2008/0292135 A1* | 11/2008 | Schafer | ........... | G06T 5/003 382/100 |
| 2011/0182529 A1* | 7/2011 | Kempe | ........... | G02B 21/0032 382/274 |
| 2014/0118529 A1* | 5/2014 | Zheng | ........... | G21K 7/00 348/80 |
| 2014/0284461 A1* | 9/2014 | Betzig | ........... | G02B 21/36 250/216 |
| 2015/0317508 A1* | 11/2015 | Zheng | ........... | G02B 21/367 348/80 |
| 2016/0195705 A1* | 7/2016 | Betzig | ........... | G02B 27/58 348/79 |
| 2016/0305883 A1* | 10/2016 | Betzig | ........... | G02B 21/16 |
| 2018/0210184 A1* | 7/2018 | Betzig | ........... | G02B 27/095 |
| 2020/0396231 A1* | 12/2020 | Krebs | ........... | G06N 5/04 |

OTHER PUBLICATIONS

Dorozynska et al, Implementation of a multiplexed structured illumination method to achieve snapshot multispectral imaging, vol. 25, No. 15 | Jul. 24, 2017 | Optics Express 17211 (Year: 2017).*
International Search Report and Written Opinion for PCT/US21/16385, filed Feb. 3, 2021. pp. 1-6.

* cited by examiner

SYSTEM AND METHOD FOR MEASURING DISTORTED ILLUMINATION PATTERNS AND CORRECTING IMAGE ARTIFACTS IN STRUCTURED ILLUMINATION IMAGING

CROSS-REFERENCE TO RELATED APPLICATION(S)

The present application is the U.S. National Stage application filed under 35 U.S.C. 371 of International Application No. PCT/US21/16385, filed Feb. 3, 2021, which claims priority to and the benefit of U.S. Provisional Patent Application No. 62/969,300, filed on Feb. 3, 2020 and entitled "System and Method for Measuring Distorted Illumination Patterns and Correcting Image Artifacts in Structured Illumination Imaging," the entirety of each of which is incorporated herein by reference.

GOVERNMENT FUNDING

N/A

BACKGROUND OF THE INVENTION

1. Field of the Invention

The present disclosure is directed generally to image processing in structured illumination microscopy (SIM).

2. Background of the Invention

Structured illumination microscopy (SIM) is a well-established method for optical section and super-resolution. The core of structured illumination is to use a periodic pattern to excite an image signal. Harmonic spatial frequencies of the periodic pattern play key roles in SIM. In super-resolution SIM, they demodulate high spatial frequency image signals to frequencies lower that of the diffraction limit and make high spatial frequencies detectable. In optical section SIM, they provide a means to remove out-of-focus light and clear blurry scattering background in deep tissue light sheet imaging.

The original SIM theory assumes the pattern has perfect periodicity. Irregularity in the illumination pattern will cause artifacts in image results. Experimentally, the pattern is always subject to aberration, either from the optical system or caused by refraction at index mismatched interface in the sample, all of which can affect the truthfulness of the result. To solve this problem, several groups proposed iterative numerical methods of estimate pattern distortion. New paradigms of SIM with random speckle patterns were attempted. Adaptive optics with two-photon excitation guide star was used to correct pattern aberrations in SIM. All these methods add complexity to SIM. They required either significantly more computation power, more exposures or more complex hardware.

Therefore, there is a need for a method to estimate and correct minor pattern distortion from raw image data and correct these distortions during SIM imaging processing.

Description of the Related Art Section Disclaimer: To the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

BRIEF SUMMARY OF THE INVENTION

The present disclosure is directed to a method and system for measuring distorted illumination patterns and correcting image artifacts in structured illumination microscopy.

The method estimates and corrects pattern distortion from the raw image data and correct distortions in SIM. Other than introducing iterative numerical methods to estimate the pattern and the target, the method provided herein resolves the challenge of a less-than-ideal pattern within the framework of the SIM theory and reconstructs the correct image non-iteratively with a modified SIM process algorithm. It does not require adaptive optics for correction aberration or extra exposures, nor does it significantly increase the computation time.

The method disclosed herein is applicable to incoherent SIM experiments that have quasi-periodic patterns, which is the case for most SIM instruments. Incoherent SIM, which captures intensity-only images from phase-less objects, such as fluorescent samples, includes the majority of SIM applications. The method does not apply to phase sensitive SIM. Most SIM instruments operates with quasi-periodic patterns that are neither fully random nor perfectly periodic. There lacks a low-cost method to measure and correct pattern imperfections during SIM instruments. The method disclosed herein provides a such solution.

The method disclosed herein can also be applied to both optical section and super-resolution SIM. However, the method requires a nominal pattern period wider than the diffraction limit. Applying the method in super-resolution SIM will require modifying the pattern period and decreasing the resolution. In optical section SIM, such as SIM light sheet, whose pattern period is typically much wider than the diffraction limit, the requirement is naturally met. Therefore, SIM light sheet imaging is discussed below to demonstrate that the method is effective in correcting an artifact from a distorted SIM pattern.

According to an aspect, the present invention is a method for measuring distorted illumination patterns and correcting image artifacts in structured illumination microscopy. The method includes the steps of: (i) generating an illumination pattern by interfering multiple beams, modulating a scanning speed or an intensity of a scanning laser, or projecting a mask onto an object; (ii) taking multiple exposures of the object with the illumination pattern shifting in phase; (iii) applying Fourier transform to the multiple exposures to produce multiple raw images; (iv) forming a linear equation set with the Fourier transformed multiple raw images; (v) solving the linear equation set to obtain multiple portions of a Fourier space image of the object, wherein the multiple portions are associated with multiple harmonic spatial frequencies of the illumination pattern; (vi) applying a circular 2-D low pass filter to a first order harmonic portion of the Fourier space image of the object; (vii) applying a Fourier Transform to the filtered first order harmonic portion of the Fourier space image of the object, producing a resulting image; (viii) calculating a pattern distortion phase map from a phase of the resulting image; and (ix) correcting a pattern distortion during image processing by making a coefficient matrix of the linear equation set varying in phase according to the pattern distortion phase map and solving an equation set in the spatial domain.

According to an embodiment of the method, all frequency components of the pattern phase distortion map are within a bandwidth of the circular 2-D low pass filter.

According to an embodiment of the method, the illumination pattern is distorted due to aberration.

According to an embodiment of the method, an illumination pattern period is wider than a diffraction limit.

According to an embodiment of the method, both the object and a point spread function of the microscope are real-valued.

According to an embodiment of the method, a nominal frequency of the pattern is less than a spatial cutoff frequency of the microscope.

According to an embodiment of the method, the illumination pattern remains at least quasi-periodic.

This and other aspects of the invention will be apparent from the embodiments described below.

BRIEF DESCRIPTION OF THE SEVERAL VIEWS OF THE DRAWING(S)

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments. Reference is now made briefly to the accompanying drawings, in which.

(greens scattered points). When the pattern is distorted, phase sampling points are shifted by $\psi(\vec{x})$ (red sampling points). The amount of shifting is spatially varying.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

The present disclosure describes a system and method for measuring distorted illumination patterns and correcting image artifacts in structured illumination microscopy (SIM).

The original SIM theory starts by considering an object $O(\vec{x})$ being illuminated by a periodic pattern. Images are captured by a microscope with a point spread function of $PSF(\vec{x})$ as $$I(\vec{x}) = [O(\vec{x}) \times P(\vec{x})] \otimes PSF(\vec{x}) \qquad (1)$$

where $$P(\vec{x}) = \Sigma_n \alpha_n \exp(in\vec{k}_0 \cdot \vec{x} + in\phi) \qquad (2)$$

represents the sample's linear (first order, n=1) and non-linear (higher orders, n>1) responses to the periodic illumination pattern, whose base spatial frequency is $\vec{k}_0$ and phase offset is 4).

Experimentally, the pattern can be generated in two ways: in wide-field illuminated SIM, the pattern is typically generated by diffracting the collimated illumination of a grating; in laser scanning light sheet SIM, the pattern is generated by modulating the scanning speed or the intensity of a scanning laser. In all cases, the spatial phase of a pattern is tightly controlled before aberration is introduced, and thus, unaffected by aberration. For example, in wide-field super-resolution SIM, the sinusoidal strip pattern is generated through interfacing ±1 orders of the same illumination beam of a grating. The phase offset $\phi$ of the pattern shifts from 0 to $2\pi$ as the grating moves laterally by a grating period. The ±1 diffraction beams may pick up different waveform distortions before reaching the focusing plane, which means Eq. 2 needs to be modified to $$P(\vec{x})=\Sigma_n\alpha_n\exp[in\vec{k}_0\cdot\vec{x}+in\psi(\vec{x})+in\phi] \quad (3)$$

where $\psi(\vec{x})$ is the wavefront mismatch between ±1 diffraction beams due to aberration. The wavefront mismatch causes the pattern to deviate from its perfect periodicity. However, the control over the pattern's overall phase $\phi$ remains.

Fourier transform of Eq. 1 yields $$\tilde{I}(\vec{k},\phi)=\Sigma_n\alpha_n\exp(in\phi)\tilde{O}_n(\vec{k}+n\vec{k}_0)OTF(k) \quad (4)$$

where $$\tilde{O}_n(\vec{k}) = \mathcal{F}\{O(\vec{x})\exp[in\psi(\vec{x})]\} \quad (5)$$
$$= \mathcal{F}\{O(\vec{x})\} \otimes \mathcal{F}\{\exp[in\psi(\vec{x})]\}$$

and $\mathcal{F}$ refers to Fourier transform.

The SIM theory requires, to perform N-th order non-linear SIM, 2N+1 exposures while shifting the pattern phase offset $\phi$ in 2N+1 steps. Fourier transforming 2N+1 raw image yields a system of linear equations given by Eq. 4, with the value of 0.1) stepping through a full $2\pi$ cycle in $$\phi_m = \frac{2\pi m}{2N+1}$$

intervals. The linear coefficient matrix of the system of linear equations is therefore $$M_{mn} = \exp\left(imn\frac{2\pi}{2N+1}\right).$$

Solving the linear equation system yields 2N+1 pieces of frequency domain images of the object:

$$\tilde{R}_n(\vec{k})=\tilde{O}_n(\vec{k}+n\vec{k}_0)OTF(\vec{k}),n=-N,N \quad (6)$$

$\tilde{R}_n(\vec{k})$ can be numerically shift back by $-n\vec{k}_0$, which yields $$\tilde{R}'_n(\vec{k})=\tilde{O}_n(\vec{k})OTF(\vec{k}-n\vec{k}_0),n=-N,N \quad (7)$$

Because $OTF(\vec{k})$ has its band limit set by the diffraction, $\tilde{R}'_n(\vec{k})$ is limited within a circular region in the frequency domain. The region is off centered by $n\vec{k}_0$ for $n\neq 0$. When $\psi(\vec{x})$ is a constant zero, i.e., the pattern is ideal, there is $\tilde{O}_n(\vec{k})=\mathcal{F}[O(\vec{k})]$. Thus, each order of $\tilde{R}'_n(\vec{k})$ reveals a portion of the frequency domain image. Merging multiple order of $\tilde{R}'_n(\vec{k})$ expands the frequency space of the imaging result and yields a super-resolution image of the object. When $\psi(\vec{x})$ is spatially varying, $\tilde{R}'_n(\vec{k})$ is compromised by effects of a distorted pattern. Without correction, the resulting image will contain artifacts.

Figure 1:
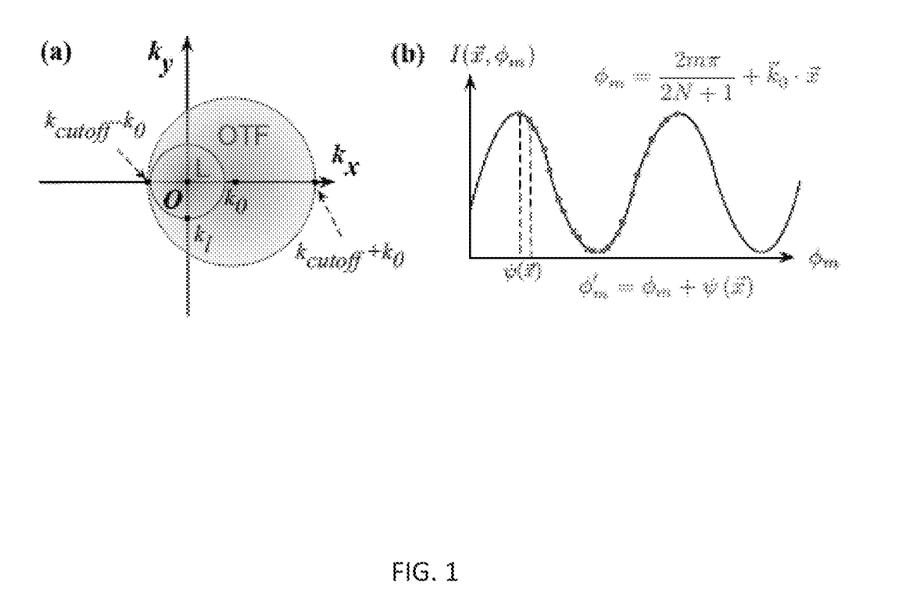
FIG. 1(a) shows a graph demonstrating that by selecting a relaxed pattern period, the nominal pattern frequency $k_0$ moves inside the OTF, leaving enough bandwidth $k_{cut\,off}$-$k_0$ to measure the pattern distortion.
FIG. 1(b) shows a graph demonstrating SIM requires raw images with patterns going through phase shifting steps $$\phi_m = \frac{2m\pi}{2N+1} + \vec{k}_0 \cdot \vec{x}.$$

Eq. 5 and Eq. 7 indicate that the raw image data does contain information about $\psi(\vec{x})$. To extract the information from the raw image data, several conditions must be met. First, SIM is applied to intensity-only imaging application, i.e., not used for phase imaging. Thus, both the object $O(\vec{x})$ and the $PSF(\vec{x})$ are real-valued. Second, we assume $\vec{k}_0$, the nominal frequency of the pattern is less than the spatial cutoff frequency $k_{cut-off}$ of the imaging system, so that low frequency regions of $R'_{\pm 1}(\vec{k})$ fall within the support of $OTF(\vec{k}\pm\vec{k}_0)$ (FIG. 1(a)). FIG. 1(a) shows by selecting a relaxed pattern period, the nominal pattern frequency $k_0$ moves inside the OTF, leaving enough bandwidth $k_{cut-off}-k_0$ to measure the pattern distortion. Third, the pattern distortion is minor, i.e., the pattern remains quasi-periodic, and the spatial frequency of $\exp[i\psi(\vec{x})]$ does not exceed $k_{cut-off}-k_0$.

When these conditions are met, a circular 2D low pass filter $L(\vec{k})$, whose cutoff frequency $k_l\leq k_{cut-off}-k_0$, can be applied to $\tilde{R}'_{\pm 1}(\vec{k})$. Inverse Fourier transform can then be applied to $L(\vec{k})R'_{\pm 1}(\vec{k})$ to get $$O'_{\pm 1}(\vec{x}) = F^{-1}[L(\vec{k})R'_{\pm 1}(\vec{k})] = \mathcal{L}\{O(\vec{x})\exp[\pm i\psi(\vec{x})]\otimes PSF(\vec{x})\} \quad (8)$$

where $\mathcal{L}$ represents the low pass filtering. In the case of a quasi-periodic pattern, because $\psi(\vec{x})$ is slow varying, there is $$O'_{\pm 1}(\vec{x})\cong\exp[\pm i\psi(\vec{x})]\mathcal{L}[O(\vec{x})\otimes PSF(\vec{x})] \quad (9)$$

Since both the object $O(\vec{x})$ and the $PSF(\vec{x})$ are real, the phase distortion map can then be calculated as $$\psi(\vec{x})=\pm\text{angle}[O'_{\pm 1}(\vec{x})] \quad (10)$$

Eq. 10 calculates the pattern distortion phase map from raw image data and reveals the actual shape of the pattern, which, as detailed in the next section, provides the base for correcting pattern distortion during SIM image processing.

Eq. 10 is valid only when all frequency components of the pattern phase distortion map fall within the bandwidth of the low pass filter $k_1$. The condition is usually met in optical-section SIM, where the pattern frequency is typically much smaller than the diffraction limited spatial frequency, leaving enough frequency bandwidth to measure the phase distortion. In super-resolution SIM, however, the pattern period is typically set to be as close to the diffraction limit as possible in order to achieve the maximal resolution, which leaves no spatial bandwidth to measure the pattern phase distortion.

Once the actual shape of the distorted pattern is known, adaptive optics can be used to compensate the phase pattern. However, an easier way is to correct pattern distortion during image processing.

The SIM experiment requires a pattern being phase shifted in 2N+1 steps, and each time, an exposure is taken. When the pattern is ideal, for an image pixel at $\vec{x}$, the pixel intensity $I(\vec{x}, \phi_m)$ is measured at 2N+1 pattern phase sampling points $\phi_m = 2m\pi/(2N+1) + \vec{k}_0 \cdot \vec{x}$. When the pattern is distorted, the pixel intensity $I(\vec{x}, \phi'_m)$ is measured at $\phi'_m = 2m\pi/(2N+1) + \psi(\vec{x}) + \vec{k}_0 \cdot \vec{x}$, which is shifted by an offset of $\psi(\vec{x})$ from the ideal situation (FIG. 1(b)). The periodic function of pixel intensity vs. pattern phase is still sufficiently and evenly sampled, but the start point of the sampling varies irregularly across the field of view and must be taken into account during image processing (FIG. 1(b)). FIG. 1(b) shows SIM requires raw images with patterns going through phase shifting steps $$\phi_m = \frac{2m\pi}{2N+1} + \vec{k}_0 \cdot \vec{x}.$$

greens scattered points). When the pattern is distorted, phase sampling points are shifted by $\phi(\vec{x})$ (red sampling points). The amount of shifting is spatially varying.

Rewriting Eq. 4 in the spatial domain yields $$I(\vec{x},\phi_m) = \Sigma_n \alpha_n \exp(in\phi_m)\{O(\vec{x})\exp(in\vec{k}_0)\exp[in\psi(\vec{x})]\otimes PSF)\} \quad (11)$$

Because $\psi(\vec{x})$ is slow varying compared to the size of PSF, there is $$I(\vec{x}, \phi_m) = \sum_n a_n \exp(in\phi_m)\exp[in\psi(\vec{x})]\left[O(\vec{x})\exp(in\vec{k}_0)\right] \otimes PSF(\vec{x}) \quad (12)$$

where the pattern phase $\phi_m$ shifted in 2N+1 steps.

Eq. 12 is still a system of linear equations, similar to the spatial domain representation of Eq. 4, except the coefficient matrix in Eq. 4 is spatially invariant whereas the coefficient matrix in Eq. 12 is spatially varying $$M(\vec{x})_{nm} = \exp\left(inm\frac{2\pi}{2N+1}\right)\exp[in\psi(\vec{x})].$$

Solving Eq. 12 yields $$R_n^{Cor}(\vec{x}) = [O(\vec{x})\exp(in\vec{k}_0)\otimes PSF(\vec{x}) \quad (13)$$

whose Fourier transform is $$\tilde{R}_n^{Cor}(\vec{k}) = \tilde{O}(\vec{k}+n\vec{k}_0)OTF(\vec{k}) \quad (14)$$

is free of artifacts from the distorted pattern and can be merged in the frequency domain to form a truthful image.

The above derivation shows that once the pattern distortion is known, artifacts can be avoided by making the processing coefficient matrix M spatially varying in phase by $\exp[in\psi(\vec{x})]$ and processing raw SIM imaging in the spatial instead of frequency domain.

The theoretical derivation shows measuring pattern distortion and correcting its artifact in SIM can be carried out with a straight-forward process, as long as two conditions are met: (1) the distortion is relatively minor, thus the phase distortion map $\psi(\vec{x})$ is relatively slow varying and (2) the pattern period is relaxed, leaving enough spatial bandwidth within the OTF to accommodate the frequency band of $\psi(\vec{x})$. Both conditions are typically met in optical section SIM. In super-resolution SIM, however, the pattern period is often set at the diffraction limit in order to achieve the maximal resolution, leaving no bandwidth for accommodate $\psi(\vec{x})$. Thus, below, the method is applied to optical section SIM.

Figure 2:
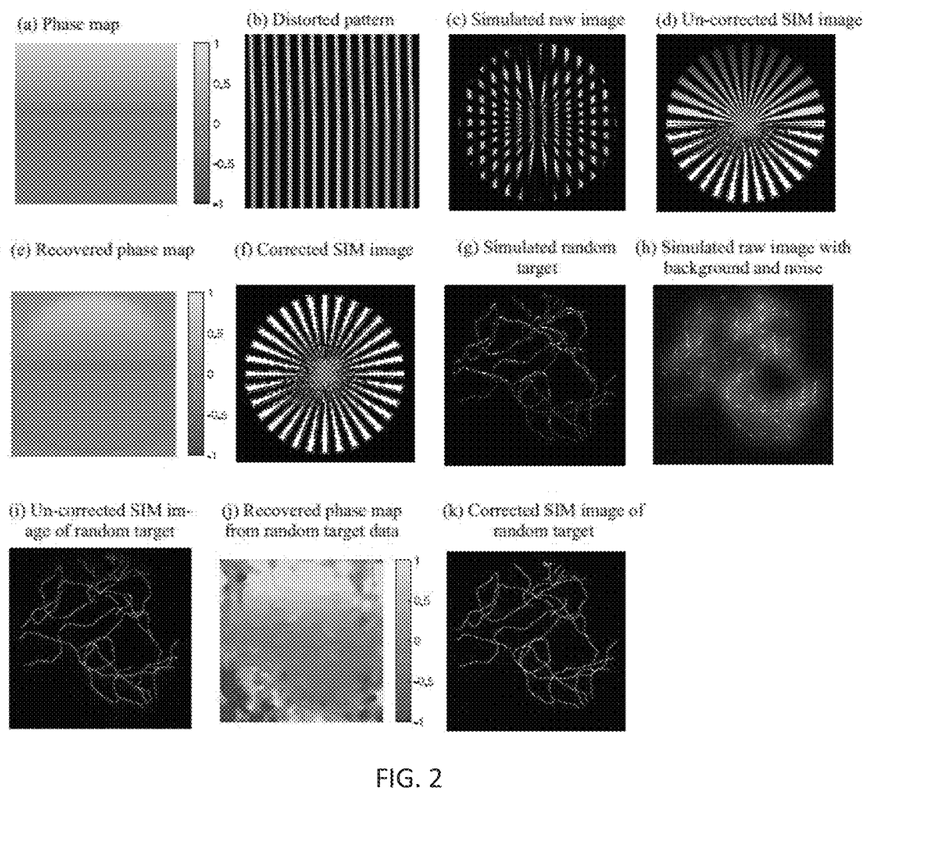
FIG. 2(a) shows a phase map where the simulation added a spatially varying phase OM in the top half of the field of view.
FIG. 2(b) shows a distorted pattern where the pattern was bended because of the phase distortion.
FIG. 2(c) shows a simulated raw SIM image that was simulated with a radial spoke object illuminated by the distorted pattern.
FIG. 2(d) shows an un-corrected SIM image from the traditional SIM processing method which shows a decreased signal in the top portion where the pattern was bended.
FIG. 2(e) shows a phase map recovered from simulated raw images following the disclosed method.
FIG. 2(f) shows a corrected and restored SIM image resulting from a known phase map.
FIG. 2(g) shows an image of a simulated random target, i.e., the simulation repeated with a randomly generated target to further test the method disclosed herein.
FIG. 2(h) shows a simulated raw SIM image that was simulated with out-of-focus background and noise.
FIG. 2(i) shows an un-corrected SIM image of a random target where artifacts due to pattern distortion persists.
FIG. 2(j) shows a recovered phase map from random target data. The recovered phase map contains noise due to the low SNR of raw images and the sparse target. Its values are not reliable in parts of the field of view where there are no structures.
FIG. 2(k) shows a fully corrected SIM image of a random target obtained with the method described herein despite noise and uncovered areas in the recovered phase map.

The optical section SIM simulation takes an idea strip pattern and adds a linearly varying phase distortion in the top half of the field of view (FOV) (FIG. 2(a)), which causes the pattern to bend in the top half FOV (FIG. 2(b)). Raw images are generated by applying such a distorted pattern on a spoke pattern object (FIG. 2(c)). The resulting SIM image, processed with the standard SIM processing method, shows significant signal loss in the top half of the FOV (FIG. 2(d)). With the phase measuring method proposed in Section 2.2, the phase distortion map can be successfully recovered in areas covered by the object (FIG. 2(e)). With the phase-corrected SIM process method described in Section 2.3, an artifact-free SIM image can be obtained, and the signal in the area of the distorted pattern is fully recovered (FIG. 2(f)).

To test the method in a realistic setting, the simulation repeats the above process with a target of randomly generated fibers distributed sparsely in the field of view (FIG. 2(g)). Out-of-focus background and Poisson noise were added into simulated raw images (FIG. 2(h)). The raw images were first processed with the traditional SIM algorithm and additional filtering steps to remove residual out-of-focus background, which could cause strip-shape artifacts in the processed image. The resulting processed SIM image exhibits artifacts due to pattern distortion (FIG. 2(i)). Fibers appear broken and blurred in the top part of the field of view where the pattern is distorted. Despite the out-of-focus background and noise, the phase distortion map is still recoverable with the new method disclosed herein (FIG. 2(j)). The corrected artifact-free SIM image was produced with the method disclosed herein (FIG. 2(k)). In areas containing no structures, phase values are not reliable. However, they do not affect the correction of the SIM image because the new algorithm disclosed herein corrects the phase distortion in the spatial domain.

Figure 3:
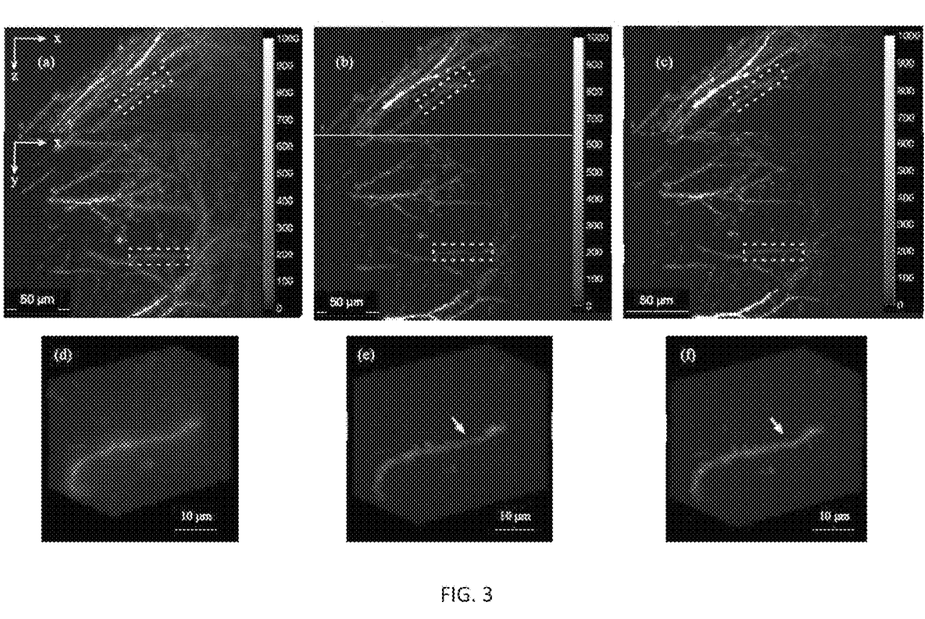
FIG. 3(a) shows X-Z and X-Y projections of a set of 3D image of Thy1:YFP mouse brain tissue, taken with uniform plane illumination. The dashed box highlights a dendrite section at approximately 60 μm deep.
FIG. 3(b) shows projections of 3D images of the same tissue, taken with SIM illumination and processed with traditional SIM algorithm.
FIG. 3(c) shows a projection of 3D images from the same SIM raw data, processed with the algorithm disclosed herein.
FIG. 3(d) shows a zoomed-in 3D rendering of the dendrite section taken from the plane illumination volumetric image set. The dendrite structure is blurry due to tissue scattering.
FIG. 3(e) shows a zoomed-in 3D rendering of the dendrite section, taken from the traditional SIM volumetric image set. Artifacts due to irregular SIM pattern can be seen along the dendrite. The arrow points to a location where the dendrite appears broken and split due to artifacts.
FIG. 3(f) shows a zoomed-in 3D rendering of the dendrite section, taken from the corrected SIM volumetric image set processed by the algorithm disclosed herein. The dendrite structure appears continuous. Spines can be clearly seen along the dendrite.

According to an experimental exemplary embodiment, the method disclosed herein is applied to experimental SIM image data of a Thy1:YFP mouse brain slice taken by a two-photon light sheet imaging system. The system used a scanning Bessel beam, provided by a Ti: Sapphire laser and shaped into a Bessel beam by a SLM, to illuminate an over 200 µm wide field of view. The same tissue was scanned twice, first with a uniform plane illumination by sweeping the 170 mW Bessel beam across the field of view at 10 FPS, second with SIM illumination, which was created by hopping the same beam in steps. The image plane was shifted in 1 µm depth step during 3D scan. A total of 86 layers were acquired. A total of 5 exposures were needed to reconstruct a single SIM image. Volumetric projections of a 200×150×86 µm³ brain tissue are shown in FIGS. 3(a)-(c). The volumetric image taken by a uniform plane illumination (FIG. 3(a)) is blurred by scattering. The dashed box highlights a dendrite section at approximately 60 µm deep.

The image taken by the SIM illumination and processed by the traditional SIM algorithm with additional filter (FIG. 3(b)) is free of scattering, but its overall image signal is less than the image processed with the new method disclosed herein (FIG. 3(c)). FIG. 3(d) shows a zoomed-in 3D rendering of the dendrite section (white dashed boxed in Figure (a)-(c)), taken from the plane illumination volumetric image set. The dendrite structure is blurry due to tissue scattering.

A zoomed-in 3D image of a dendrite within the volume shows that the signal loss in the SIM image processed with the traditional method (FIG. 3(e)) is in fact caused by artifacts. The dendrite structure in FIG. 3(e) has significant signal loss along the center, making the dendrite appears broken and split. These artifacts were routinely seen in deep brain tissue SIM images where the SIM pattern is likely be distorted after traveling a long distance in heterogenous tissue. The same SIM raw image set, when processed by the method disclosed herein (FIG. 3(f)), produces a continuous dendrite structure and reveals individual spines, which are not visible in the plane illumination image.

The original SIM method was built on the assumption that a perfect periodic illumination pattern can be engineered. In reality, especially in the case of SIM light sheet of deep tissue, such assumption often does not hold. Light sheet uses a focusing beam to illuminate across the tissue. Aberration can alter the illumination beam's propagating mode and bends the beam. Index-mismatching between the water and tissue will cause the beam to change its direction when it enters the immersed tissue. The situation could change as the beam scans to different portion of the tissue sample, as a biological sample often has an irregular shape. When an illumination pattern with irregularity is used to take the SIM data and the traditional processing algorithm, which assumes a perfect pattern, is used to process the raw data, the resulting image will contain artifacts.

The method disclosed herein can measure the distorted quasi-periodic SIM pattern from the raw SIM data and remove artifacts with an improved SIM process algorithm. The method was tested with both simulation and experiments. The results provide that the method is effective in challenging situations in deep tissue imaging, where strong scattering background exists, SNR is low, and the sample structure is sparse. The method truthfully resolved fine neuron structures in mouse brain tissue where the traditional SIM process failed.

The method presented here, in theory, could be applied to both optical section SIM and super-resolution SIM. However, because the algorithm of measuring the SIM pattern requires the illumination pattern period to be wider the diffraction limit, current applications of our method are limited to optical section SIM where the illumination pattern is typically wide and SIM is used to for the purpose of removing out-of-focus or scattering background, not for the purpose of reaching a resolution beyond the diffraction limit.

Such requirement is needed in order to allocate a spatial bandwidth and measure the irregularities in the SIM pattern. Image systems have limited spatial bandwidth, set by the NA. To measure the SIM pattern and the sample structure at the same time with the same imaging system means two tasks will have to share the total bandwidth. The optical section SIM naturally does not make full use of the bandwidth because super-resolution is not needed. As the simulation and experiment results demonstrated, the "redundant" bandwidth of optical section SIM carries information about the SIM pattern, which can be extracted with a simple processing algorithm. In super-resolution SIM experiments, however, the full bandwidth is always dedicated to imaging the sample. Measuring the SIM pattern through the same imaging system will require sacrificing the sample imaging bandwidth and resolution. It is possible to measure the SIM illumination distortion with an auxiliary imaging system, such as a two-photon guide star. Adaptive optics were previously used to correct the distortion. The pattern correcting algorithm presented herein can be used to achieve the same effect at a much lower cost.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A method for measuring distorted illumination patterns and correcting image artifacts in structured illumination microscopy, comprising the steps of:
   generating an illumination pattern by interfering multiple beams, modulating a scanning speed or an intensity of a scanning laser, or projecting a mask onto an object;
   taking multiple exposures of the object with the illumination pattern shifting in phase;
   applying Fourier transform to the multiple exposures to produce multiple raw images;
   forming a linear equation set with the Fourier transformed multiple raw images;
   solving the linear equation set to obtain multiple portions of a Fourier space image of the object, wherein the multiple portions are associated with multiple harmonic spatial frequencies of the illumination pattern;
   applying a circular 2-D low pass filter to a first order harmonic portion of the Fourier space image of the object;
   applying a Fourier Transform to the filtered first order harmonic portion of the Fourier space image of the object, producing a resulting image;
   calculating a pattern distortion phase map from a phase of the resulting image; and
   correcting a pattern distortion during image processing by making a coefficient matrix of the linear equation set varying in phase according to the pattern distortion phase map and solving an equation set in the spatial domain.

2. The method of claim 1, wherein all frequency components of the pattern phase distortion map are within a bandwidth of the circular 2-D low pass filter.

3. The method of claim 1, wherein the illumination pattern is distorted due to aberration.

4. The method of claim 1, wherein an illumination pattern period is wider than a diffraction limit.

5. The method of claim 1, wherein both the object and a point spread function of the microscope are real-valued.

6. The method of claim 1, wherein a nominal frequency of the pattern is less than a spatial cutoff frequency of the microscope.

7. The method of claim 1, wherein the illumination pattern remains at least quasi-periodic.

* * * * *